(12) United States Patent
Darrow et al.

(10) Patent No.: US 9,951,825 B2
(45) Date of Patent: Apr. 24, 2018

(54) MULTI-PLATE CLUTCH

(71) Applicant: Sikorsky Aircraft Corporation, Stratford, CT (US)

(72) Inventors: David A. Darrow, Stratford, CT (US); Thomas L. Tully, Jr., Oxford, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 61 days.

(21) Appl. No.: 14/915,098

(22) PCT Filed: Jun. 24, 2014

(86) PCT No.: PCT/US2014/043837
§ 371 (c)(1),
(2) Date: Feb. 26, 2016

(87) PCT Pub. No.: WO2015/047498
PCT Pub. Date: Apr. 2, 2015

(65) Prior Publication Data
US 2016/0208864 A1    Jul. 21, 2016

Related U.S. Application Data

(60) Provisional application No. 61/871,190, filed on Aug. 28, 2013.

(51) Int. Cl.
*F16D 13/52* (2006.01)
*F16D 23/12* (2006.01)
(Continued)

(52) U.S. Cl.
CPC .............. *F16D 13/52* (2013.01); *B64C 27/12* (2013.01); *B64C 27/22* (2013.01); *B64C 27/82* (2013.01); *B64D 35/00* (2013.01); *F16D 23/12* (2013.01); *B64C 2027/8236* (2013.01); *F16D 2023/123* (2013.01)

(58) Field of Classification Search
None
See application file for complete search history.

(56) References Cited

U.S. PATENT DOCUMENTS

| 1,906,613 A | 5/1933 | Keese |
|---|---|---|
| 2,972,910 A | 2/1961 | Menge, Sr. et al. |

(Continued)

OTHER PUBLICATIONS

EP SR dated Feb. 17, 2017 in U330202EP, EP Application No. 14849430.5, 7 pages.
(Continued)

*Primary Examiner* — Jacob S. Scott
*Assistant Examiner* — Timothy Hannon
(74) *Attorney, Agent, or Firm* — Cantor Colburn LLP

(57) ABSTRACT

A multi-plate clutch apparatus is provided and includes a multi-plate clutch disposed to occupy clutch and non-clutch positions at which rotation of an input shaft is and is not transmitted to an output shaft, respectively, a drive element disposed about the multi-plate clutch and configured to generate rotational energy and a linear actuator disposed to convert the rotational energy of the drive element to linear movement by which the multi-plate clutch is controllable to occupy one of the clutch and non-clutch positions.

17 Claims, 4 Drawing Sheets

(51) Int. Cl.
  *B64C 27/82* (2006.01)
  *B64C 27/22* (2006.01)
  *B64C 27/12* (2006.01)
  *B64D 35/00* (2006.01)

(56) References Cited

U.S. PATENT DOCUMENTS

| | | | |
|---|---|---|---|
| 3,277,671 A | | 10/1966 | Winstone et al. |
| 3,911,324 A | | 10/1975 | Bishop |
| 4,159,444 A | * | 6/1979 | Bartlett .............. G05B 9/03 244/194 |
| 4,177,693 A | | 12/1979 | Ivanko et al. |
| 4,209,734 A | * | 6/1980 | Osder .............. G05B 9/03 244/194 |
| 5,080,640 A | * | 1/1992 | Botterill .............. F16H 48/295 475/150 |
| 6,478,708 B2 | * | 11/2002 | Krisher .............. F16H 48/22 475/150 |
| 6,561,939 B1 | * | 5/2003 | Knapke .............. F16D 28/00 192/84.6 |
| 6,626,278 B2 | | 9/2003 | Sugita et al. |
| 6,659,250 B2 | * | 12/2003 | Nestler .............. F16D 28/00 192/84.6 |
| 6,808,037 B1 | * | 10/2004 | Mueller .............. B60K 17/16 180/247 |
| 6,851,537 B2 | | 2/2005 | Bowen |
| 7,296,767 B2 | | 11/2007 | Palcic et al. |
| 7,434,764 B2 | | 10/2008 | Lappos et al. |
| 7,849,988 B2 | | 12/2010 | Suzuki et al. |
| 2001/0047919 A1 | | 12/2001 | Mayr |
| 2006/0269414 A1 | | 11/2006 | Palcic et al. |
| 2007/0095628 A1 | | 5/2007 | Niederbacher |
| 2009/0224727 A1 | * | 9/2009 | Burke .............. F16D 11/04 322/40 |

OTHER PUBLICATIONS

International Search Report and Written Opinion issued in PCT/US20141043837 dated Mar. 13, 2015, 17 pgs.

Georgia Tech, "25th Annual Student Design Competition Graduate Category Athena", Danel Guggenheim School of Aerospace Engineering, Georgia Institute of Technology, Atlanta, Georgia, 2008, 119 pages.

Unicopter.com, "Other: Helicopter—Houtside—Coaxial—Sikorsky—X2 TD", Sep. 18, 2010, downloaded from http://www.unicopter.com/1465.html on Oct. 30, 2013, 9 pages.

* cited by examiner

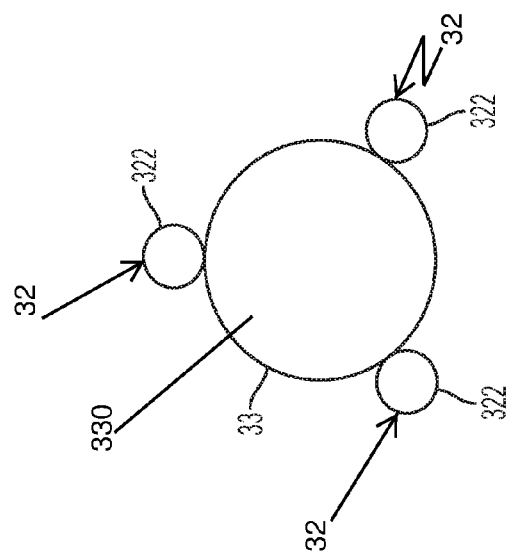
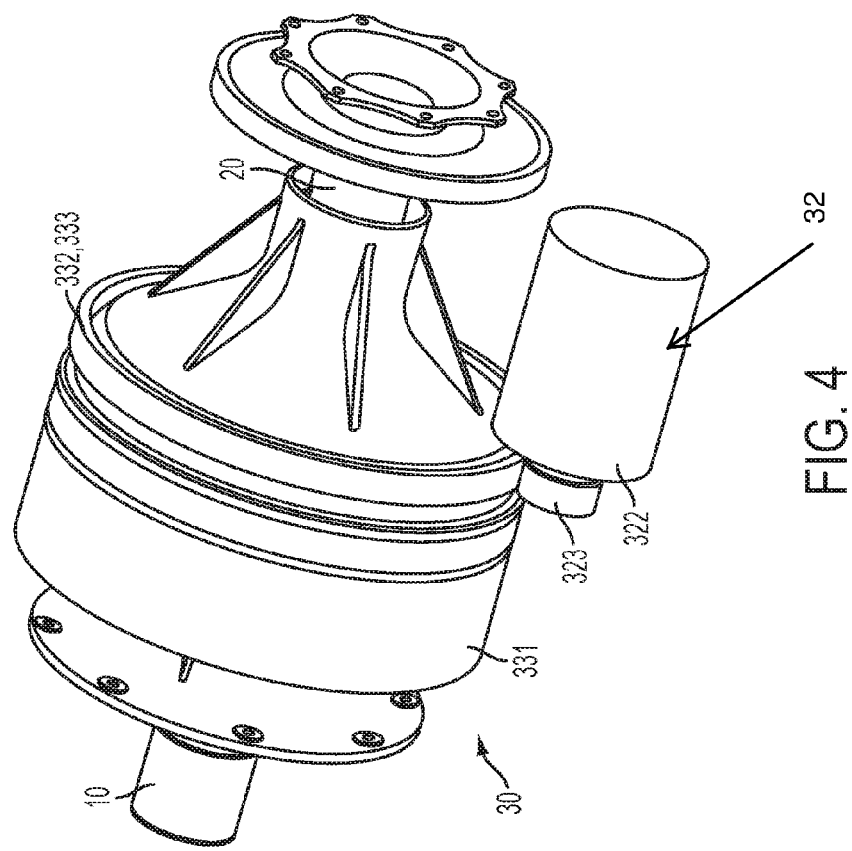

MULTI-PLATE CLUTCH

CROSS REFERENCE TO RELATED APPLICATIONS

This application claims the benefit of priority to PCT Application No. US2014/043837, filed Jun. 24, 2014, which in turn claims priority to U.S. Provisional Application No. 61/871,190, filed on Aug. 28, 2013. The entire contents of PCT Application No. US2014/043837 and U.S. Provisional Application No. 61/871,190 are incorporated herein by reference.

FEDERAL RESEARCH STATEMENT

This invention was made with government support under W911W6-13-2-0003 awarded by the Army. The government has certain rights in the invention.

BACKGROUND OF THE INVENTION

The subject matter disclosed herein relates to a multi-plate clutch and, more particularly, to a multi-plate clutch of an aircraft.

Modern aircraft may include an airframe having an upper portion at which a main rotor is rotatably supported and a tail portion at which a tail rotor or propeller is rotatably supported. The airframe may be further configured to encompass an engine and a transmission by which the main rotor and the propeller are driven to rotate about respective rotational axes. The transmission may include an input shaft coupled to the engine, an output shaft coupled to the propeller and a clutch by which rotation of the input shaft is transmitted to the output shaft.

Typically, the clutch is operated by a complex set of controls that increase a weight and cost of the transmission and the aircraft as a whole. The controls frequently require their own power source and electrical systems, which exacts further costs to the aircraft design.

BRIEF DESCRIPTION OF THE INVENTION

According to one aspect of the invention, a multi-plate clutch apparatus is provided and includes a multi-plate clutch disposed to occupy clutch and non-clutch positions at which rotation of an input shaft is and is not transmitted to an output shaft, respectively, a drive element disposed about the multi-plate clutch and configured to generate rotational energy and a linear actuator disposed to convert the rotational energy of the drive element to linear movement by which the multi-plate clutch is controllable to occupy one of the clutch and non-clutch positions.

In accordance with additional or alternative embodiments, the input and output shafts are disposed in an end-to-end parallel alignment.

In accordance with additional or alternative embodiments, the multi-plate clutch includes a first plate coupled to and rotatable with the input shaft, a second plate coupled to and rotatable with the output shaft, a plate assembly interposed between and coupled to the first and second plates and a movable plate movable with the linear actuator to cause the plate assembly to provide for engagement or disengagement of the first and second plates.

In accordance with additional or alternative embodiments, the plate assembly includes a plurality of interleaved thrust and washer plates.

In accordance with additional or alternative embodiments, the multi-plate clutch further includes a roller bearing interposed between the input shaft and the movable plate.

In accordance with additional or alternative embodiments, the drive element includes a servo motor.

In accordance with additional or alternative embodiments, the drive element is configured with a hard-over failure safety.

In accordance with additional or alternative embodiments, the linear actuator includes a ball-screw drive element.

In accordance with additional or alternative embodiments, the linear actuator includes a spur ring engageable with a spur gear of the drive element.

According to another aspect of the invention, an aircraft is provided and includes an engine, a propeller and a multi-plate clutch apparatus disposed between the engine and the propeller. The multi-plate clutch apparatus includes a multi-plate clutch disposed to occupy clutch and non-clutch positions at which engine-driven rotation of an input shaft is and is not transmitted to an output shaft coupled to the propeller, respectively, a drive element disposed about the multi-plate clutch and configured to generate rotational energy and a linear actuator disposed to convert the rotational energy of the drive element to linear movement by which the multi-plate clutch is controllable to occupy one of the clutch and non-clutch positions.

In accordance with additional or alternative embodiments, the multi-plate clutch includes a first plate coupled to and rotatable with the input shaft, a second plate coupled to and rotatable with the output shaft, a plate assembly interposed between and coupled to the first and second plates and a movable plate movable with the linear actuator to cause the plate assembly to provide for engagement or disengagement of the first and second plates.

In accordance with additional or alternative embodiments, the drive element includes a servo motor.

In accordance with additional or alternative embodiments, the drive element is configured with a hard-over failure safety.

In accordance with additional or alternative embodiments, the linear actuator includes a ball-screw drive element.

In accordance with additional or alternative embodiments, the linear actuator includes a spur ring engageable with a spur gear of the drive element, These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 4 is a perspective view of the multi-plate clutch of FIG. 3; and

FIG. 5 is an axial schematic view of drive elements of the multi-plate clutch of FIG. 3 in accordance with embodiments.

The detailed description explains embodiments of the invention, together with advantages and features, by way of example with reference to the drawings.

DETAILED DESCRIPTION OF THE INVENTION

As will be described below, external actuation for a multi-disk clutch is provided in a configuration that has high reliability and low weight and can be powered electrically. The external actuation is provided by way of a non-back-drivable ring shaped linear actuator combined with three rotary servo motors through a spur gear or helical gear drive. The motor shafting may have a shear feature that allows one or more of the motors to have a hard-over failure safety feature.

Figure 1:
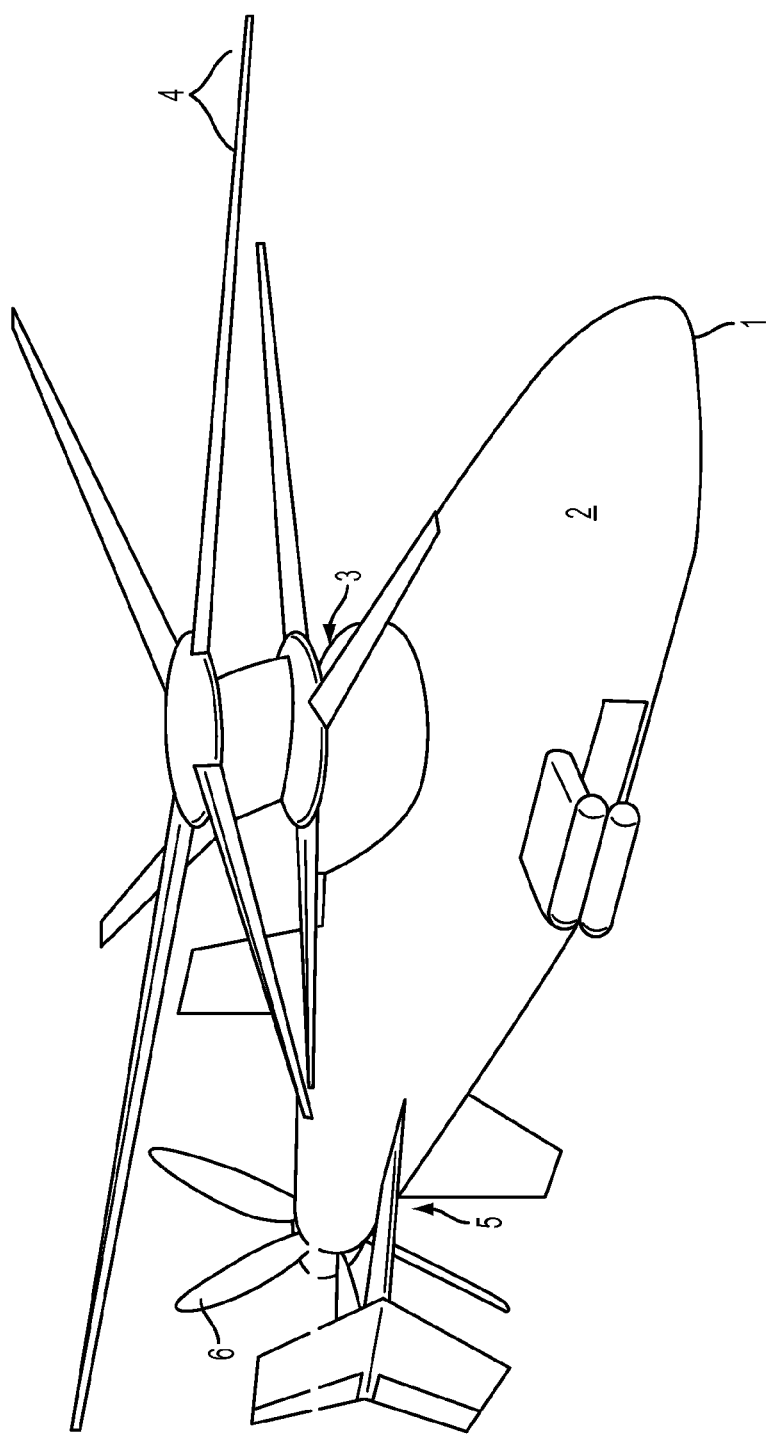
FIG. 1 is a perspective view of an aircraft according to embodiments.
Figure 2:
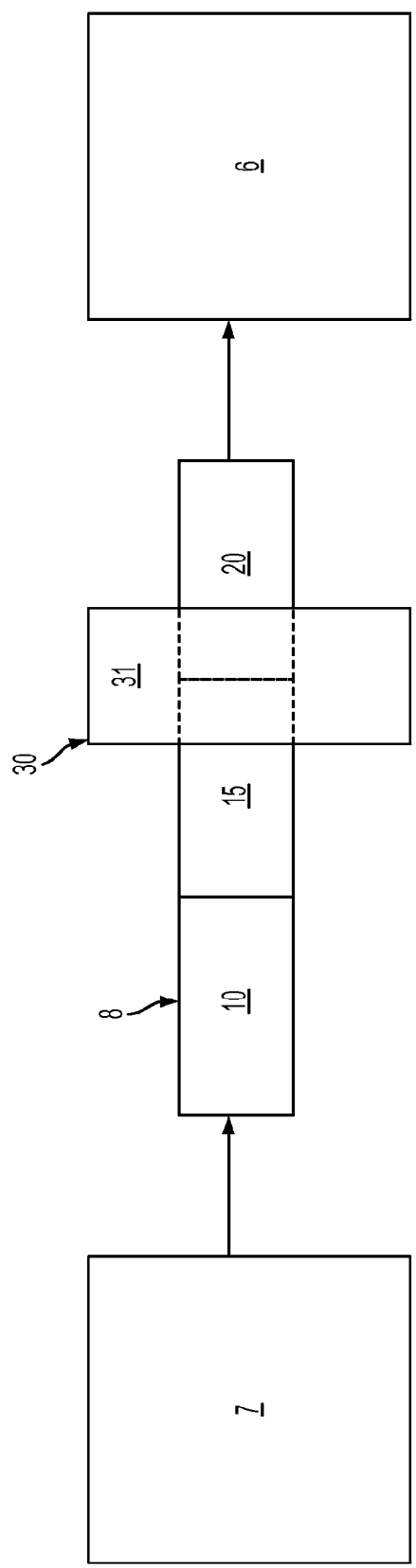
FIG. 2 is a schematic view of an engine and transmission of the aircraft of FIG. 1.
Figure 3:
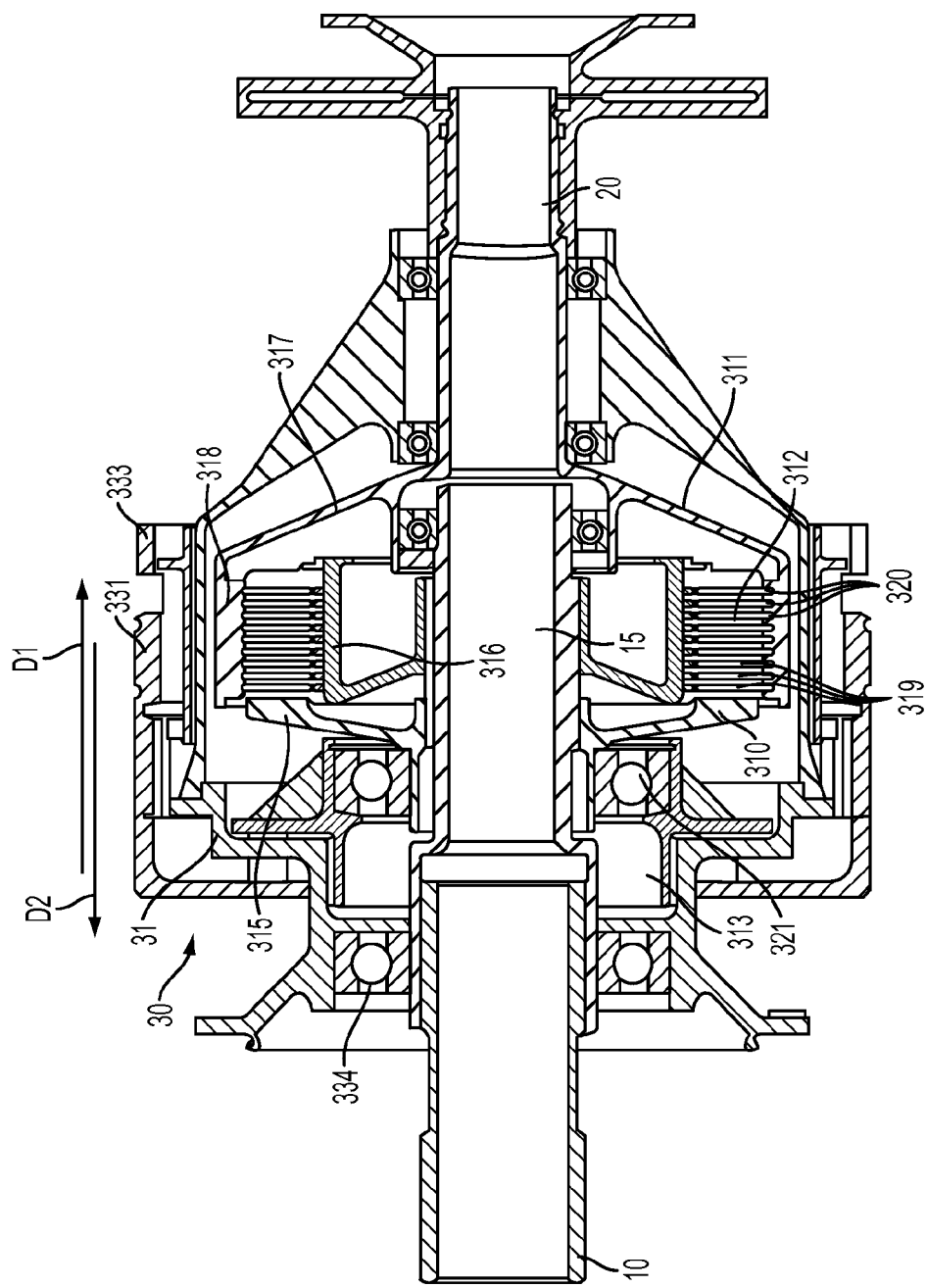
FIG. 3 is a side view of a multi-plate clutch in accordance with embodiments.

With reference to FIGS. 1-3, an aircraft 1 is provided and includes an airframe 2, which is formed to define a cabin configured to accommodate a pilot and, in some cases, a crew or passengers, flight control devices and a flight control computer. The airframe 2 has an upper portion 3 at which a main rotor 4 is rotatably supported and a tail portion 5 at which a propeller 6 is rotatably supported. The main rotor 4 may be provided as a single rotor or as coaxial, counter-rotating main rotors. The propeller 6 may be provided as a pusher propeller or as a tail rotor. The airframe 2 is further configured to encompass an engine 7 and a transmission 8 by which the main rotor 4 and the propeller 6 are driven to rotate about respective rotational axes.

As shown in FIG. 1, the aircraft 1 may be configured as a helicopter with coaxial, counter-rotating main rotors 4 and a pusher propeller 6. However, it is to be understood that this is not required and that the description provided herein is applicable to other aircraft configurations.

As shown in FIG. 2, the transmission 8 may include an input shaft 10 and an output shaft 20 that can be disposed in an end-to-end parallel alignment with an intermediate shaft 15 interposed between the input shaft 10 and the output shaft 20 or in another type of non-end-to-end or non-parallel configuration. The input shaft 10 is coupled to the engine 7 and thereby driven to rotate about a longitudinal axis thereof by the engine 7. The intermediate shaft 15 is rotatable with the input shaft 10. The output shaft 20 may be coupled to the input shaft 10 and the propeller 6 such that the rotation of the input shaft 10 is transmitted to the propeller 6 to thereby drive propeller 6 rotation about the corresponding rotational axis.

The transmission 8 further includes a multi-plate clutch apparatus 30. The multi-plate clutch apparatus 30 is operably disposed between the engine 7 and the propeller 6. More particularly, the multi-plate clutch apparatus 30 includes a multi-plate clutch 31, which is operably disposed between the input shaft 10 and the output shaft 20. In this position, the multi-plate clutch 31 is disposed to occupy a first, clutch position and a second, non-clutch position. With the multi-plate clutch 31 disposed in the first, clutch position, the rotation of the input shaft 10 as driven by the engine 7 is transmitted to the output shaft 20 and, in turn, to the propeller 6. Alternatively, with the multi-plate clutch 31 disposed in the second, non-clutch position, the rotation of the input shaft 10 as driven by the engine 7 is prevented from being transmitted to the output shaft 20 or the propeller 6.

With reference to FIGS. 3, 4 and 5, the multi-plate clutch apparatus 30 includes the multi-plate clutch 31, a drive element 32 and a linear actuator 33. The drive element 32 may be disposed proximate to or about the multi-plate clutch 31 and includes one or more servo motors 322 configured to generate rotational energy. The linear actuator 33 is disposed to convert the rotational energy of the servo motors 322 of the drive element 32 to linear movement by which the multi-plate clutch 31 is controllable to occupy one of the first, clutch position and the second, non-clutch position.

The multi-plate clutch 31 includes a first plate 310, a second plate 311, a plate assembly 312 interposed between and coupled to the first and second plates 310 and 311 and a movable plate 313. The first plate 310 is coupled to and rotatable with the input shaft 10 and the intermediate shaft 15 and includes a first flange 315 and a first body portion 316. The first flange 315 is splined to the intermediate shaft 15 and rigidly extends from the intermediate shaft 15 to the plate assembly 312. The second plate 311 is coupled to and rotatable with the output shaft 20 and includes a second flange 317 and a second body portion 318. The second flange 317 is splined to the output shaft 20 and rigidly extends from the plate assembly 312 to the output shaft 20. The plate assembly 312 may include respective pluralities of interleaved thrust plates 319 and washer plates 320. The thrust plates 319 are coupled with the first body portion 316 and the washer plates 320 are coupled with the second body portion 318. The movable plate 313 is supported on a roller bearing 321 such that the movable plate 313 is rotatable relative to the input shaft 10 and the intermediate shaft 15 (i.e., the movable plate 313 is rotationally stationary). The movable plate 313 is also axially and linearly movable along the longitudinal axis of the input shaft 10 and the intermediate shaft 15 with the linear actuator 33 to cause the plate assembly 312 to provide for engagement or disengagement of the first and second plates 310 and 311.

An outer race of the roller bearing 321 is connected to the movable plate 313 and an inner race of the roller bearing 321 is connected to the first plate 310. As such, as the movable plate 313 moves axially and linearly along the longitudinal axis of the input shaft 10 and the intermediate shaft 15 with the linear actuator 33 in first and second directions D1 and D2, respectively, the movable plate 313 causes the first plate 310 to move similarly in the first and second directions D1 and D2.

The movement of the first plate 310 in the first direction D1 causes the thrust plates 319, which are coupled to the first body portion 316 of the first plate 310, to come into frictional contact with the washer plates 320, which are coupled to the second body portion 318 of the second plate 311. This frictional contact provides for transmission of the rotation of the input shaft 10 and the intermediate shaft 315 to the output shaft 20 via the first and second plates 310 and 311 and the plate assembly 312. Thus, the movement of the first plate 310 in the first direction D1 is associated with an engagement of the multi-plate clutch 31 and terminates with the multi-plate clutch 31 occupying the first, clutch position.

The movement of the first plate 310 in the second direction D2 causes the thrust plates 319 to become removed from the washer plates 320, which terminates the transmission of the rotation of the input shaft 10 and the intermediate shaft 315 to the output shaft 20. Thus, the movement of the first plate 310 in the second direction D2 is associated with a disengagement of the multi-plate clutch 31 and terminates with the multi-plate clutch 31 occupying the second, non-clutch position.

In accordance with embodiments, where the drive element 32 includes a plurality of servo motors 322, the plurality of servo motors 322 may be disposed in a group of three servo motors 322 with uniform separation about the linear actuator 33. With this number of servo motors 322, the drive element 32 may exhibit a hard-over failure safety feature in that, in an event of a failure of one of the servo motors 322 where the failing servo motor 322 drives the linear actuator 33 in the wrong direction, the other two servo motors 322 can overpower the failing servo motor 320 and continue to control the linear actuator 33 to move in the correct direction.

In accordance with further embodiments, the linear actuator 33 may be provided as a non-backdrivable ball-screw drive element 330 or another similar device. In the former case, the linear actuator 33 includes a main body 331 having an end portion and a cylindrical portion and a gear 332. The end portion of the main body 331 is supported on a roller bearing 334 such that the main body 331 is rotatable relative to the input shaft 10 and the intermediate shaft 15 (i.e., the main body 331 is rotationally stationary). The gear 332 may be provided as a helical gear or spur ring 333 disposed at a distal end of the cylindrical portion of the main body 331. The spur ring 333 is engageable with spur gears 323 of each of the servo motors 322 of the drive element 32 such that the rotational energy of the drive element 32 is transferred to the spur ring 333 whereby the rotational energy is converted into linear movement of the main body 331.

The spur gears 323 of each of the servo motors 322 of the drive element 32 can be rotated in clockwise or counter-clockwise directions such that the spur ring 333 can be correspondingly rotated in counter-clockwise or clockwise directions. Such counter-clockwise rotation of the spur ring 333 may be associated with linear movement of the main body 331 in the first or the second direction D1 or D2 while the clockwise rotation of the spur ring 333 may be associated with linear movement of the main body 331 in the second or the first direction D2 or D1. Meanwhile, the main body 331 is coupled with the movable plate 312 of the multi-plate clutch 31 such that the linear movement of the main body 331 in either direction is associated with corresponding movement of the movable plate 312. Thus, the engagement or disengagement of the multi-plate clutch 31 is controllable in accordance with the rotation direction of the spur gears 323.

The flight control computer as well as existing on-board electrical and power systems may be coupled to the drive element 32 such that the servo motors 322 can be powered and the flight control computer can issue signals to the servo motors 322 instructing the servo motors 322 to provide for clockwise or counter-clockwise rotation of the spur gears 323. As such, the flight control computer can control the engagement or the disengagement of the multi-plate clutch 31 and the corresponding transmission or non-transmission of rotation from the input shaft 10 to the output shaft 20.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A multi-plate clutch apparatus, comprising:
    an outer housing having an external surface, a gear being defined by the external surface;
    an inner housing arranged within the outer housing;
    a multi-plate clutch arranged within the inner housing, the multi-plate clutch being disposed to occupy clutch and non-clutch positions at which rotation of an input shaft is and is not transmitted to an output shaft, respectively;
    a drive element disposed about the multi-plate clutch and configured to generate rotational energy, the drive element having a gear element meshingly engaged with the gear defined by the external surface of the housing; and
    a linear actuator disposed to convert the rotational energy of the drive element to linear movement by which the multi-plate clutch is controllable to occupy one of the clutch and non-clutch positions.

2. The multi-plate clutch apparatus according to claim 1, wherein the input and output shafts are disposed in an end-to-end parallel alignment.

3. The multi-plate clutch apparatus according to claim 1, wherein the multi-plate clutch comprises:
    a first plate coupled to and rotatable with the input shaft;
    a second plate coupled to and rotatable with the output shaft;
    a plate assembly interposed between and coupled to the first and second plates; and
    a movable plate movable with the linear actuator to cause the plate assembly to provide for engagement or disengagement of the first and second plates.

4. The multi-plate clutch apparatus according to claim 3, wherein the plate assembly comprises a plurality of interleaved thrust and washer plates.

5. The multi-plate clutch apparatus according to claim 3, wherein the multi-plate clutch further comprises a roller bearing interposed between the input shaft and the movable plate.

6. The multi-plate clutch apparatus according to claim 1, wherein the drive element comprises a servo motor.

7. The multi-plate clutch apparatus according to claim 1, wherein the drive element is configured with a hard-over failure safety.

8. The multi-plate clutch apparatus according to claim 1, wherein the linear actuator comprises a ball-screw drive element.

9. The multi-plate clutch apparatus according to claim 1, wherein the linear actuator comprises a spur ring engageable with a spur gear of the drive element.

10. The multi-plate clutch according to claim 1, wherein the drive element comprises a plurality of drive elements arranged about the housing.

11. An aircraft, comprising: an engine;
    a propeller; and
    a multi-plate clutch apparatus disposed between the engine and the propeller and comprising:
    an outer housing having an external surface, a gear being defined by the external surface;
    an inner housing arranged within the outer housing;
    a multi-plate clutch arranged within the inner housing, the multi-plate clutch being disposed to occupy clutch and non-clutch positions at which engine-driven rotation of an input shaft is and is not transmitted to an output shaft coupled to the propeller, respectively;
    a drive element disposed about the multi-plate clutch and configured to generate rotational energy, the drive element having a gear element meshingly engaged with the gear defined by the external surface of the housing; and
    a linear actuator disposed to convert the rotational energy of the drive element to linear movement by which the multi-plate clutch is controllable to occupy one of the clutch and non-clutch positions.

12. The aircraft according to claim 11, wherein the multi-plate clutch comprises:
   a first plate coupled to and rotatable with the input shaft;
   a second plate coupled to and rotatable with the output shaft;
   a plate assembly interposed between and coupled to the first and second plates; and
   a movable plate movable with the linear actuator to cause the plate assembly to provide for engagement or disengagement of the first and second plates.

13. The aircraft according to claim 11, wherein the drive element comprises a servo motor.

14. The aircraft according to claim 11, wherein the drive element is configured with a hard-over failure safety.

15. The aircraft according to claim 11, wherein the linear actuator comprises a ball-screw drive element.

16. The aircraft according to claim 11, wherein the linear actuator comprises a spur ring engageable with a spur gear of the drive element.

17. The aircraft according to claim 11, wherein the drive element comprises a plurality of drive elements arranged about the housing.

\* \* \* \* \*